(12) United States Patent
Cheng et al.

(10) Patent No.: US 10,185,074 B2
(45) Date of Patent: Jan. 22, 2019

(54) BACKLIGHT MODULE AND THE BACKLIGHT MODULE USED IN LIQUID CRYSTAL DISPLAYS

(71) Applicant: Wuhan China Star Optoelectronics Technology Co., Ltd., Wuhan, Hubei (CN)

(72) Inventors: Yan Cheng, Guangdong (CN); Shih-hsiang Chen, Guangdong (CN); Mei Han, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 172 days.

(21) Appl. No.: 15/112,525

(22) PCT Filed: Jun. 21, 2016

(86) PCT No.: PCT/CN2016/086641
§ 371 (c)(1),
(2) Date: Jul. 19, 2016

(87) PCT Pub. No.: WO2017/201782
PCT Pub. Date: Nov. 30, 2017

(65) Prior Publication Data
US 2018/0106939 A1    Apr. 19, 2018

(30) Foreign Application Priority Data
May 27, 2016    (CN) .......................... 2016 1 0362488

(51) Int. Cl.
*F21V 7/04*    (2006.01)
*F21V 8/00*    (2006.01)
(Continued)

(52) U.S. Cl.
CPC .......... *G02B 6/005* (2013.01); *G02B 6/0055* (2013.01); *G02B 6/0068* (2013.01);
(Continued)

(58) Field of Classification Search
CPC ............. G02B 6/0088; G02F 1/133528; G02F 1/133617; G02F 1/1336; G02F 1/133615; G02F 1/133621
(Continued)

(56) References Cited

U.S. PATENT DOCUMENTS

2015/0009453 A1    1/2015 Cha et al.
2016/0377786 A1*   12/2016 Ham ................. G02F 1/133603
                                                                     349/65
2017/0168217 A1*   6/2017 Li ........................ G02B 6/0026

FOREIGN PATENT DOCUMENTS

CN    104777670 A    7/2015
CN    104865749 A    8/2015
(Continued)

*Primary Examiner* — Anh Mai
*Assistant Examiner* — Matthew Peerce
(74) *Attorney, Agent, or Firm* — Andrew C. Cheng

(57) ABSTRACT

The present invention provides a backlight module used in liquid crystal displays. The backlight module includes a quantum dots film, a light guide plate and a light source module. A light is emitted from the light source module enter into the quantum dots film through the light guide plate. The quantum dots film comprises an active region and an inactive region. The light source module includes a blue light source and a green light source. The blue light source is corresponding to the active region, and the green light source is corresponding to the inactive region. The present invention further provides a backlight module used in liquid crystal displays. The present invention provides a backlight module and quantum dots film of liquid crystal display which can resolve a defect of quantum dots film fails in the (Continued)

cutting position, and the quantum dots film has high color gamut conversion.

12 Claims, 2 Drawing Sheets

(51) Int. Cl.
*G02F 1/13357* (2006.01)
*G02F 1/1368* (2006.01)
*G02F 1/1362* (2006.01)
*G02F 1/1335* (2006.01)

(52) U.S. Cl.
CPC .......... *G02F 1/1336* (2013.01); *G02F 1/1368* (2013.01); *G02F 1/133615* (2013.01); *G02F 1/133621* (2013.01); *G02F 2001/133614* (2013.01); *G02F 2001/136222* (2013.01); *G02F 2202/36* (2013.01)

(58) Field of Classification Search
USPC .......................................................... 362/606
See application file for complete search history.

(56) References Cited

FOREIGN PATENT DOCUMENTS

| CN | 105388666 A | 3/2016 |
|----|-------------|--------|
| CN | 105467673 A | 4/2016 |
| CN | 105588040 A | 5/2016 |

* cited by examiner

BACKLIGHT MODULE AND THE BACKLIGHT MODULE USED IN LIQUID CRYSTAL DISPLAYS

CROSS REFERENCE

This application claims the priority of Chinese Patent Application No. 201610362488.1 filed on May 27, 2016, the disclosure of which is incorporated herein by reference in its entirety.

FIELD OF THE INVENTION

The present invention relates to a technology of liquid crystal display, and more particularly, to a backlight module and a liquid crystal display with the backlight module.

BACKGROUND OF THE INVENTION

Level of color gamut in current Thin Film Transistor-Liquid Crystal Displays (TFT-LCD) is usually low, generally only about 72%. Currently, in order to improve the level of color gamut on TFT-LCD, a quantum dots (QD) film is mainly used to achieve high color gamut conversion. That is, QD is packaged in a glass tube, and the glass tube is arranged between in a blue light emitting diode and a light guide plate. However, water vapor can easily infiltrate through the cutting position in the QD film. The QD will fail in such environment with water and oxygen. Wherein, diameter of a green QD is smaller than a red QD. The green QD has more surface energy, so it is easier to fail by reacting with water and oxygen and resulting an inactive purple region. For mobile products with a narrow frame, failing in the cutting position results in the QD film would not properly function better in the product.

In order to resolve the problem encountered by the prior art, in the technology, the present invention want to find a way to resolve a defect of QD film which fails in the cutting position, so as to achieve the QD film has high color gamut conversion and solve deficiencies of prior art.

SUMMARY OF THE INVENTION

The present invention provides a backlight module which can resolve a defect of QD film which fails in the cutting position, and the QD film has high color gamut conversion.

The present invention further provides a liquid crystal display with the backlight module.

The present invention provides a backlight module used in liquid crystal displays. The backlight module includes a QD film, a light guide plate and a light source module. A light emitted from the light source module enters into the QD film through the light guide plate. The QD film comprises an active region and an inactive region. The light source module includes a blue light source and a green light source. The blue light source is corresponding to the active region, and the green light source is corresponding to the inactive region.

Wherein the green light emitted from the green light source and the blue light emitted from the blue light source enter into the QD film through the light guide plate. The green light and the blue light are mixed with a red light each other in an inactive region of QD film, so as to become a white light.

Wherein the inactive region is located around the active region and the blue light source is located between in the green light source.

Wherein the light source module is a Light Emitting Diode (LED) light strip. The blue light source is a blue LED and the green light source is a green LED. The blue LED is located in the middle of the LED light strip, and the green LED is located in both ends of the LED light strip.

Wherein protective layers are arranged on upper and lower surfaces of the QD film.

The present invention further provides a liquid crystal display other, which comprises a backlight module, a transistor layer arranged on the backlight module sequentially and a panel. The backlight module comprises a quantum dot film, a light guide plate and a light source module. A light is emitted from the light source module enter into the quantum dot film through the light guide plate. The quantum dot film comprises an active region and an inactive region. The light source module comprises a blue light source and green light source. The blue light source is relative to the position of the active region, and the green light source is relative to the position of the inactive region.

Wherein the liquid crystal display further comprises a reflective layer arranged on one side of the light guide plate which is opposite to the quantum dot film.

Comparing to the prior art, the present invention provides a backlight module by arranging the green light source located in the relative inactive region of QD film, the green light emitted from the green light source and the blue light emitted by the blue light source are mixed with a red light each other in an inactive region of QD film to become a white light. Thereby a defect of dysfunction in inactive region because of the cutting position in the QD film can be resolved effectively, so as to resolve a problem of abnormal display resulted from dysfunction of the QD film along its edges, and improve the high color gamut conversion. The liquid crystal display is also to have a higher color gamut.

BRIEF DESCRIPTION OF DRAWINGS

In order to give a better and thorough understanding to the whole and other intended purposes, features and advantages of the technical solution of the present invention, detailed description will be given with respect to preferred embodiments provided and illustrated here below in accompanied drawings. Apparently, with the spirit of the embodiments disclosed, person in the skilled in the art can readily come out with other modifications as well as improvements without undue experiment. In addition, other drawings can be readily achieved based on the disclosed drawings.

DESCRIPTION OF PREFERRED EMBODIMENT

Technical implementation will be described below clearly and fully by combining with drawings made in accordance with an embodiment in the present invention. Obviously, the described embodiments are merely part of embodiment of the present invention, not at all. Based on the embodiments of the present invention, on the premise of embodiments in the absence of creative work, all other embodiments are in the scope of protection in the present invention.

Additionally, description will be given by the preferred embodiments along with the accompanied drawings. It can be used to implement a specific embodiment. Direction terms are mentioned in the present invention, for example, "upper", "lower", "front", "back", "left", "right", "inside", "outside", "side" and so on, only refer to the direction of accompanied drawings. Thus, it is better and clearer to describe and understand the present invention by using direction terms, rather than implying the devices or elements are referred to a specific direction, and a structure or an operation with a specific direction. Therefore, it can't be understood the limit of the present invention.

In the description of the present invention, it should be noticed that, technical terms "mounting," "linkage," and "connection" should be construed in general unless there are clearly defined and limited otherwise. For example, it may be a fixed connection, it may be also to be a detachable connection, or it may be an integral connection; it may be a mechanical connection, it may be a direct connection, it may be also to be connected by through intermediaries, it may be an interior connection between in two devices. Those technical terms above for skilled in the arts, they can understand the substantial meaning of the present invention.

Further, in the description of the present invention, "plurality" means two or more unless there are specific explanations otherwise. If a term "process" appeared in the specification, it is not only to mean a separate process, when it can't be differentiated clearly between other processes, it is also to include in the term so long as it can achieve the expected work. Additionally, a numerical range which is indicated by "~" means the minimum and maximum values of the range are before and after referred "~," respectively. In drawings, using identical symbolic in similar or identical structural units.

Figure 1:
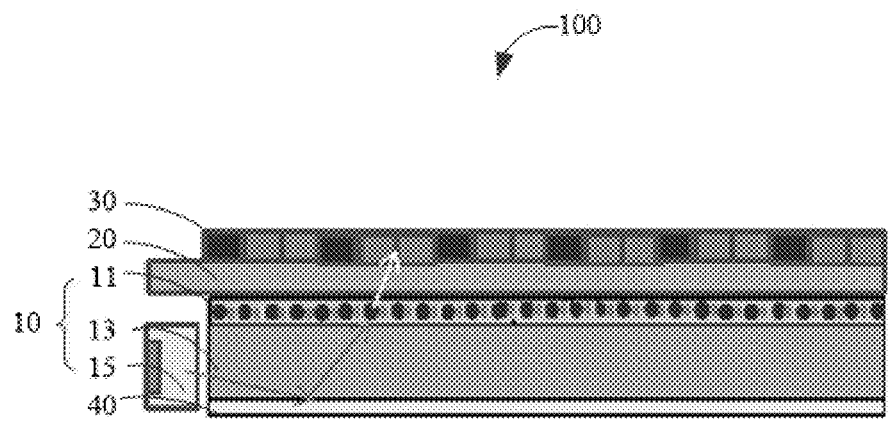
FIG. 1 is a cross sectional view of a liquid crystal display made in accordance with an embodiment in the present invention.

Referring to FIG. 1, FIG. 1 is a cross sectional view of a liquid crystal display made in accordance with an embodiment in the present invention. The liquid crystal display 100 includes a backlight module 10, a Thin Film Transistor (TFT) substrate 20 arranged on the backlight module sequentially and a color filter 30 as recited in FIG. 1.

The backlight module 10 includes a QD film 11, a light guide plate 13 and a light source module 15. Wherein the QD film 11 is arranged on the light guide plate 13, and the QD 11 is located in the TFT substrate 20 which is opposite to the color filter 30. The QD 11 is located between the TFT substrate 20 and the light guide plate 13. Preferably, the color filter 30, the TFT substrate 20, the quantum dot film 11 and the light guide plate 13 stacked from top to bottom, sequentially. The light source module 15 is located in one end of the light guide plate 13. Light emitted from light source module 15 enters into the QD film 11 through the light guide plate 13, and the light enters into the color filter 30 through the QD film 11. The Schematic of light transmission is shown in FIG. 1.

Figure 2:
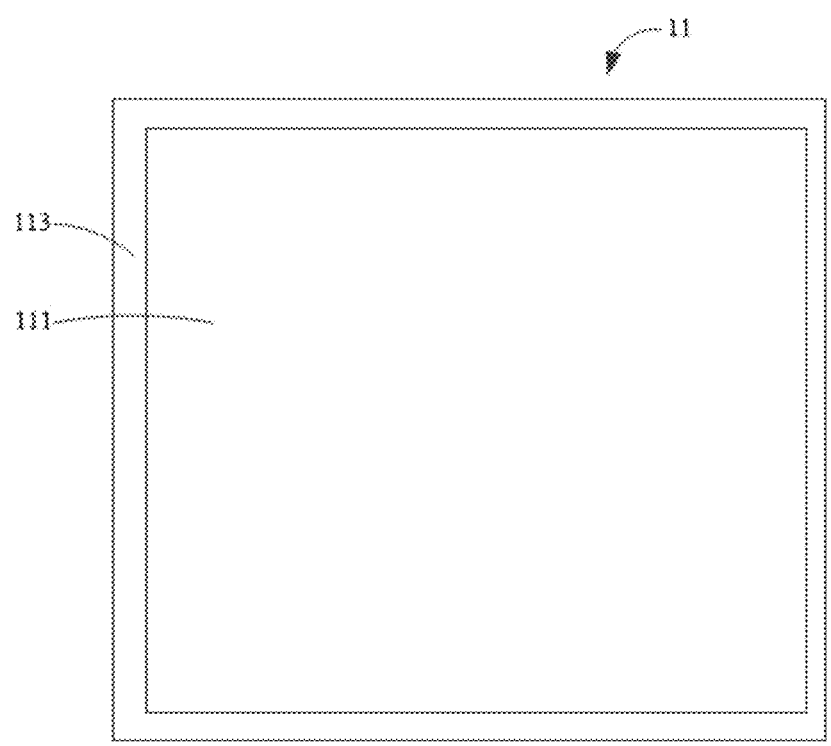
FIG. 2 is a floor plan view of a quantum dots film made in accordance with an embodiment in the present invention.

Referring to FIG. 2, FIG. 2 is a floor plan view of a QD film 11 made in accordance with an embodiment in the present invention. Specifically, the QD film 11 includes an active region 111 and an inactive region 113. The active region 111 is in the central area of the QD film 11, which is defined as a region with high efficient color gamut conversion. The active region 111 emits white light when a blue light passes through it. The inactive region 113 is located around the QD film 11, which is located in around of the active region 111. The inactive region 113 is defined as a region with low efficient color gamut conversion in the QD film 11. The inactive region 113 is usually located along the edge of cutting edges of the QD film 11. The inactive region 113 emits red light when a blue light passes through it and become an inactive region with purple light shown.

Figure 3:
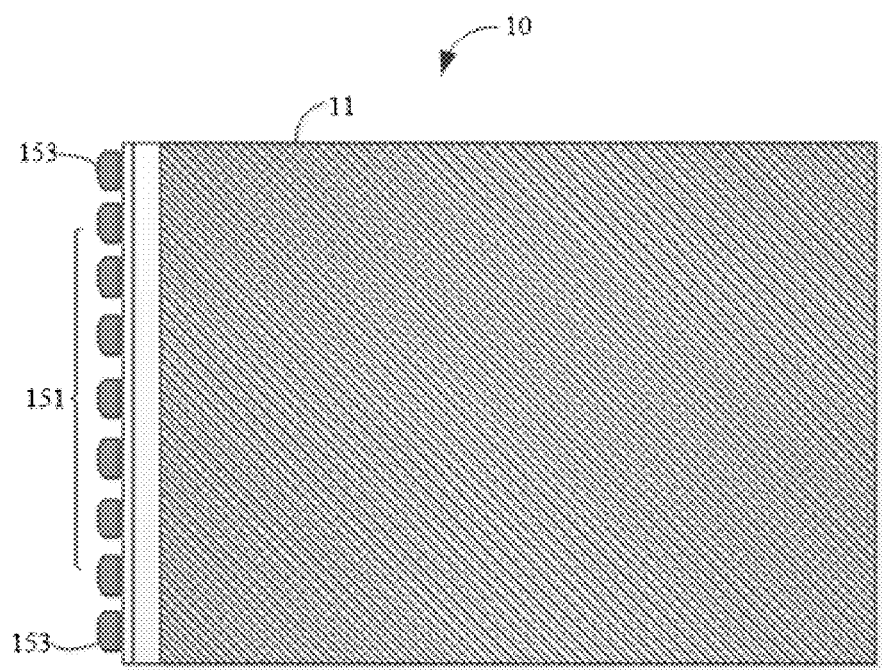
FIG. 3 is a vertical view of a backlight module made in accordance with an embodiment in the present invention.

Referring to FIG. 3, FIG. 3 is a vertical view of a backlight module made in accordance with an embodiment in the present invention. The light source module 15 includes a blue light source 151 and green light source 153. In the preferred embodiment, the number of the blue light sources 151 is seven, the number of the green light sources 153 is two, wherein the blue light sources 151 are located between in the green light 153 sources. Specifically, the blue light source 151 is corresponding to the active region 111 and the green light sources 153 is corresponding to the inactive region 113. When a light emitted from the blue light source 151 is passing through the active region 111, it becomes a white light. And when a green light emitted from the green light source 153 and a blue light emitted from the blue light source 151 enter into the QD film 11 through the light guide plate 13 and mixed with a red light emitted from inactive region 113 in the QD film 11 each other, it becomes a whit light. Thereby a defect of dysfunction in inactive region 113 because of the cutting position in the QD film 11 can be resolved effectively, that is, a purple effect found along the edge of the QD film 11 resulted from lack of green light. It can effectively resolve a defect, i.e. a dysfunction occurred in inactive region 113 when QD film is cut. A purple light in the edge region (i.e., the inactive region 113) can become a white light which is consistent with the white light in the active region 111, so as to resolve a problem of abnormal display resulted from dysfunction of the QD film along its edges, and further improve the high color gamut conversion of the QD film 11. It can be readily appreciated that, in other embodiments, the number of the blue light source 151 is not limited to seven, the number of the green light source 153 is also limited to a two, both of which can also be other numbers. Wherein the blue light source 151 is corresponding to the active region 111 and the green light sources 153 is corresponding to the inactive region 113.

In the preferred embodiment of the present embodiment, the light source module 15 is a Light Emitting Diode (LED) light strip, the blue light source 151 can be a blue LED and the green light source 153 is a green LED. Wherein the blue LED is located in the middle of the LED light strip; the green LED is located in both ends of the LED light strip.

It can be readily appreciated that, protective layers can be also arranged on the TFT substrate 20 which the QD film 11 is arranged toward and the light guide plate 13 (not shown in figure). The protective layer, on the one hand, can be used to provide a more flattened surface for the QD film 11, and on the other hand, the protective layer can well protect the QD film 11 and fully ensure its color gamut conversion.

It can be readily appreciated that, in an embodiment of the present invention, the liquid crystal display 100 further includes a reflective layer 40. The reflective layer 40 is arranged on the bottom the backlight module 10. In particular, the reflective layer 40 is arranged on one a side of the light guide plate 13 which is opposite to the QD film 11. The reflective layer 40 can reflect a light emitted from the light guide plate 13 back to the light guide plate 13, so as to improve the efficiency of light and further enhance luminance and energy efficiency.

According to the backlight module 10 provided by embodiment of the present invention, the green light source 153 is located in the position of the inactive region 113 related to the QD film 11, then a green light emitted from green light source 153 and a blue light emitted from blue light source 151 are mixed with a red light emitted from the inactive region 113 of QD film 11 each other, so it becomes a white light. A defect or dysfunction in inactive region 113 because of the cutting position in the QD film 11 can be resolved effectively, that is purple spots because of its lack of green light in the edge region of the QD film 11, so as to resolve a problem of abnormal display resulted from dysfunction of the QD film along its edges, and further improve the high color gamut conversion of the QD film 11. The liquid crystal display 100 is also to have a higher color gamut. The backlight module 10 of the invention can be applied in various liquid crystal displays and make it possible to achieve high color gamut design of various liquid crystal displays.

In the description of the present specification, the reference terms of "an embodiment," "some embodiments," "an example," "a specific example" or "some examples, " etc., mean certain and substantial features, structure, material or characteristic features are included into at least one preferred embodiment. In the present specification, the expressions of those reference expressions do not refer to the same embodiments or examples. Furthermore, the substantial features, structures, materials or characteristics can be properly included or combined within any one or multiple embodiments.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A backlight module for liquid crystal display, wherein the backlight module includes a quantum dot film, a light guide plate and a light source module; light emitting from the light source module to enter the quantum dot film through the light guide plate; the quantum dot film comprising an active region and an inactive region; the light source module including a blue light source and a green light source; the blue light source corresponding, in position, to the active region; the green light source corresponding, in position, to the inactive region;
   wherein the blue light source emits blue light of which a first portion passes through the active region of the quantum dot film to be converted into white light and a second portion passes through the inactive region to be converted into red light; and
   wherein the green light source emits green light that is mixed with the blue light emitting from the blue light source and the red light that is converted from the second portion of the blue light that passes through the inactive region to generate white light; wherein the light source module is a light emitting diode (LED) light strip, the blue light source is a blue LED and the green light source is a green LED; the blue LED is located in the middle of the LED light strip; the green LED is located in both ends of the LED light strip.

2. The backlight module as recited in claim 1, wherein the inactive region is located around the active region; the blue light source is located between in the green light source.

3. The backlight module as recited in claim 2, wherein protective layers are arranged on upper and lower surfaces of the quantum dot film.

4. The backlight module as recited in claim 1, wherein protective layers are arranged on upper and lower surfaces of the quantum dot film.

5. The backlight module as recited in claim 1, wherein protective layers are arranged on upper and lower surfaces of the quantum dot film.

6. A liquid crystal display comprising a backlight module, a Thin Film Transistor substrate and a color filter being sequentially arranged on the backlight module; wherein the backlight module includes a quantum dot film, a light guide plate and a light source module; light emitting from the light source module to enter the quantum dot film through the light guide plate; the quantum dot film comprising an active region and an inactive region; the light source module including a blue light source and a green light source; the blue light source corresponding, in position, to the active region; the green light source corresponding, in position, to the inactive region;
   wherein the blue light source emits blue light of which a first portion passes through the active region of the quantum dot film to be converted into white light and a second portion passes through the inactive region to be converted into red light; and
   wherein the green light source emits green light that is mixed with the blue light emitting from the blue light source and the red light that is converted from the second portion of the blue light that passes through the inactive region to generate white light; wherein the light source module is a LED light strip, the blue light source is a blue LED and the green light source is a green LED; the blue LED is located in the middle of the LED light strip; the green LED is located in both ends of the LED light strip.

7. The liquid crystal display as recited in claim 6, wherein the inactive region is located around the active region; the blue light source is located between in the green light source.

8. The liquid crystal display as recited in claim 7, wherein the liquid crystal display further comprises a reflective layer; the reflective layer is arranged on one side of the light guide plate which is opposite to the quantum dot film.

9. The liquid crystal display as recited in claim 6, wherein the liquid crystal display further comprises a reflective layer; the reflective layer is arranged on one side of the light guide plate which is opposite to the quantum dot film.

10. The liquid crystal display as recited in claim 6, wherein protective layers are arranged on upper and lower surfaces of the quantum dot film.

11. The liquid crystal display as recited in claim 10, wherein the liquid crystal display further comprises a reflective layer; the reflective layer is arranged on one side of the light guide plate which is opposite to the quantum dot film.

12. The liquid crystal display as recited in claim 6, wherein the liquid crystal display further comprises a reflective layer; the reflective layer is arranged on one side of the light guide plate which is opposite to the quantum dot film.

* * * * *